Figure 4:
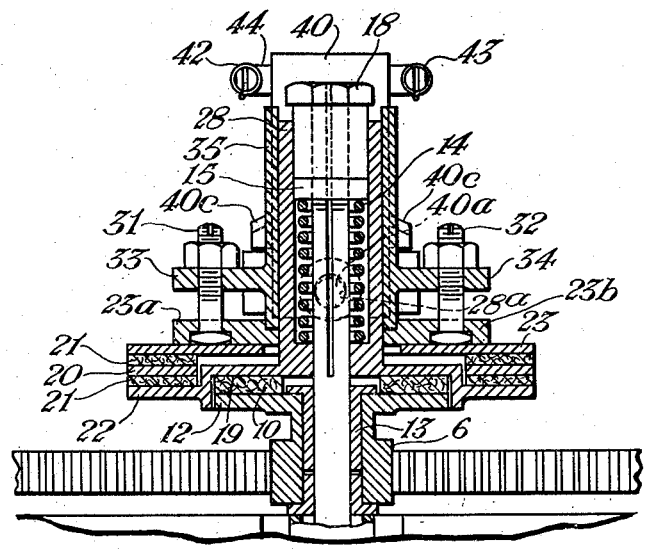

March 27, 1945.  G. V. JEFFERSON ET AL  2,372,579
SPEED GOVERNOR
Filed Feb. 2, 1943  2 Sheets-Sheet 1

INVENTORS
Glen V. Jefferson and
BY Stanley F. Gillespie
THEIR ATTORNEY

Patented Mar. 27, 1945

2,372,579

UNITED STATES PATENT OFFICE 2,372,579

SPEED GOVERNOR

Glen V. Jefferson, Edgewood, Pa., and Stanley E. Gillespie, Evanston, Ill., assignors, by mesne assignments, to Western Railroad Supply Company, Chicago, Ill.

Application February 2, 1943, Serial No. 474,478

8 Claims. (Cl. 188—187)

Our invention relates to speed governors, and particularly to speed governors suitable for use on highway crossing gates to limit the raising and lowering speed of the gate arms.

In one well-known form of highway crossing gate shown and described in Letters Patent of the United States No. 2,295,419, granted to Samuel Miskelly on September 8, 1942, the gate arm is arranged to fall by gravity from its raised to its lowered position and to be returned to its raised position by an electric motor. It has recently been proposed to modify the operating mechanism for this gate so that the motor will not only be effective to raise the gate arm but will also be effective to drive the gate arm at least part way from its raised to its lowered position to insure against the gate arm being held clear by some abnormal condition such as a high wind or a formation of ice. In normal operation it is desired to have the gate arm lower in twelve seconds which corresponds to one motor speed, and to clear in eight seconds which corresponds to a somewhat higher motor speed.

One object of our present invention is to provide a speed governor in the form of a centrifugally operated disc type friction brake for application to the motor shaft of a gate of the type shown in said patent, which governor will act to frictionally limit the motor speed to the desired value while the gate arm is being lowered, but which will not exert any braking force on the motor while the gate arm is being raised unless the motor speed increases above the normal clearing speed, due for example, to the gate arm having become broken off while the gate arm was in its lowered position.

According to our invention the governor comprises a stationary brake disc provided on each side with a brake lining and disposed between two rotatable brake discs. The one movable brake disc is formed integrally with a sleeve splined to the motor shaft, while the other brake disc is secured to a spider mounted with some clearance on said sleeve. A pair of oppositely disposed centrifuge weights are pivotally supported on trunnion pins mounted in bosses formed on said spider, and are provided with laterally projecting fingers which extend into cam slots formed in said sleeve. The cam slots are helically arranged, and the parts are so proportioned that when the direction of rotation of the motor shaft is reversed, the inertia of the centrifuge weights, said spider and the associated movable brake disc will cause these parts to rotate relative to said sleeve a sufficient amount to move the fingers on the centrifuge weights from one end of the cam slots to the other, and that this relative angular movement will move the movable brake discs toward or away from each other, depending upon the direction of rotation of the motor shaft, to one or the other of two relative axial positions. The centrifuge weights are biased toward the motor shaft by means of springs, and the parts are further so proportioned that when they occupy the relative axial positions they normally occupy when the motor is rotating in the direction to lower the gate arm, the outward movement of the centrifuge weights which occurs at the desired lowering speed will act through the fingers and cam slots to move the movable brake shoes into frictional engagement with the brake linings with sufficient force to limit the motor speed to the desired lowering speed, but that, when the parts occupy the relative axial positions they occupy when the motor is rotating in the direction to raise the gate arm, the outward movement of the weights which takes place at the normal clearing speed will be insufficient to move the movable brake discs into frictional engagement with the brake linings. If, however, the motor speed increases above the normal clearing speed due, for example, to the gate arm being broken off, the weights will then move outwardly a sufficient amount to operate the brake and thus limit the motor speed to a value which will not cause damage to the mechanism. The parts are still further so proportioned that if they fail to shift due to inertia when the direction of rotation of the motor is reversed, the resultant frictional contact of the braking surfaces which will then take place will cause the parts to shift to the proper axial position to thereby obtain the desired differential braking action.

Other objects and characteristic features of our invention will become apparent as the description proceeds.

The present invention is to an improvement upon that described and claimed in the copending application for Letters Patent of the United States, Serial No. 471,069, filed by Charles R. Beall, on January 1, 1943, for a Speed governor.

We shall describe one form of governor embodying our invention, and shall then point out the novel features thereof in claims.

Figure 5:
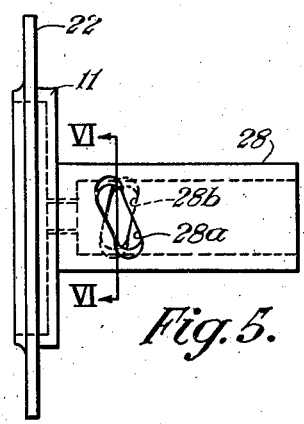
Figure 6:
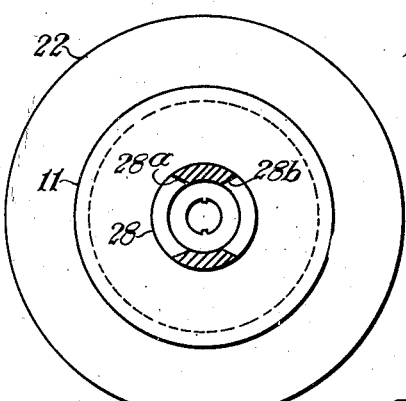
Figure 1:
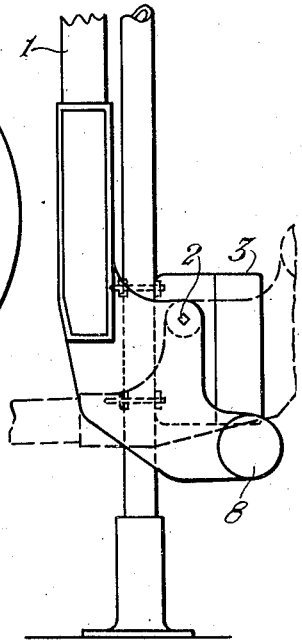
Figure 7:
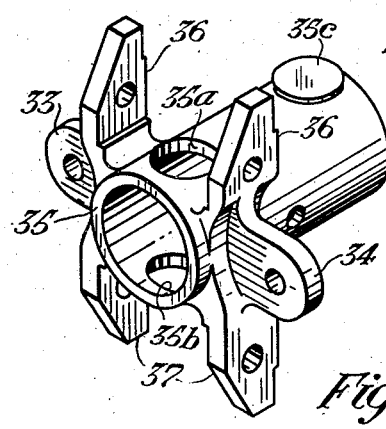
Figure 2:
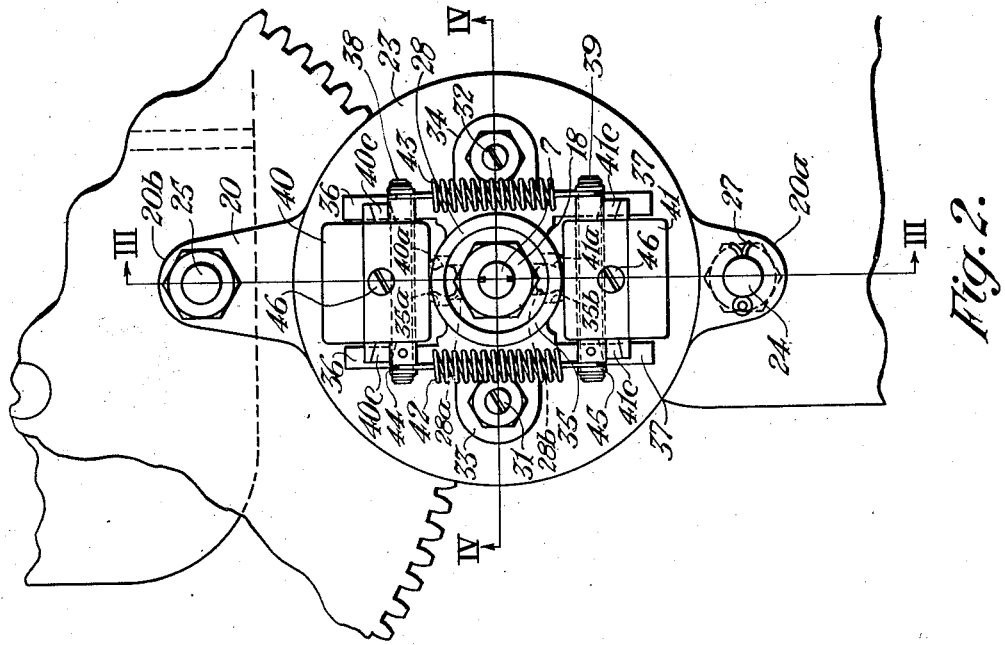
Figure 3:
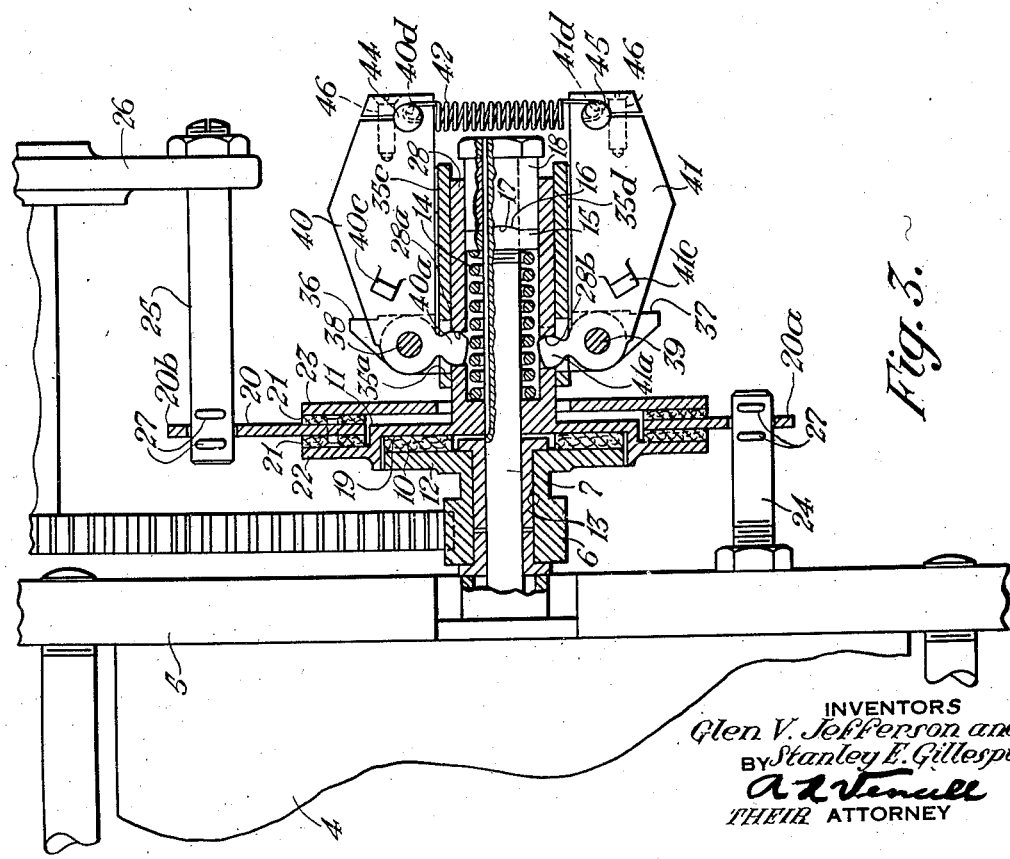

In the accompanying drawings, Fig. 1 is a side elevational view showing a highway crossing gate operated by a motor driven mechanism the motor of which is provided with a governor embodying our invention. Fig. 2 is an enlarged end view showing the governor embodying our invention mounted in the intended manner on the motor of the gate operating mechanism shown in Fig. 1. Figs. 3 and 4 are sectional views taken on the lines III—III and IV—IV, respectively, of Fig. 2. Fig. 5 is a detail view of one of the parts forming part of the governor shown in Figs. 2, 3 and 4. Fig. 6 is a sectional view taken on the line VI—VI of Fig. 5. Fig. 7 is a detail view in isometric projection of a different one of the parts forming part of the governor shown in Figs. 2, 3 and 4.

Similar reference characters refer to similar parts in each of the several views.

As was pointed out hereinbefore, a governor embodying our invention is constructed primarily for application to the motor of the operating mechanism of an automatic crossing gate of the type shown in Letters Patent of the United States No. 2,295,419, and accordingly for convenience in illustrating and describing our invention we have shown it applied to the motor of this particular operating mechanism. It should be distinctly understood, however, that it is not limited to this particular use, but on the contrary is useful wherever it is desired to frictionally impose one speed limit on a member when it is rotated in one direction and another speed limit on the member when it is rotated in the opposite direction.

Referring now to Fig. 1, the crossing gate here illustrated comprises the usual roadway arm 1 mounted on the operating shaft 2 of an operating mechanism 3 of the type shown in Letters Patent of the United States No. 2,295,419 referred to above. Inasmuch as this mechanism in itself forms no part of our present invention and is described in detail in said patent, it is believed to be sufficient for purposes of the present disclosure to point out that this mechanism includes an electric motor 4 secured to one wall 5 of the mechanism, as shown in Figs. 2 and 3, and connected through a friction or slip coupling which we shall describe presently with a pinion 6 mounted on the shaft 7 of the motor. The pinion 6, in turn, is connected through a suitable gear train not shown with the gate arm operating shaft 2, whereby rotation of the motor will raise or lower the gate arm depending upon the direction of rotation. The mechanism also includes an electromagnet (not shown) which becomes energized when the gate arm is moved to its raised position and which, when energized, is effective to prevent rotation of the gate arm in the direction to cause it to lower. The gate arm is biased to its lowered position by gravity, and is connected with counterweights 8 which enable the gravity bias to be adjusted to the desired value. Heretofore, the motor has only been energized when it is desired to raise the gate arm, and gravity has been relied upon entirely to effect the lowering of the gate arm. However, when the motor is provided with the governor presently to be described, it is contemplated that the motor will also be energized during at least the first part of the movement of the gate arm from its raised to its lowered position to insure that the gate arm will not be retained in its clear position at any time due to some abnormal condition such as a high wind or a formation of ice which might tend to hold the gate arm in its clear position. The mechanism further includes suitable circuit controlling contacts not shown for controlling the energization of the motor to obtain the desired operation of the gate.

To conserve space in the mechanism case and also to conserve materials, the governor has been combined with the usual friction or slip coupling which is provided on the motor shaft 7 to protect the mechanism gearing from excessive strains which might occur in the event that the mechanism is brought to a sudden stop due, for example, to the movement of the gate arm being interfered with by a vehicle. The friction coupling is mounted on the right-hand end of the motor shaft 7, as viewed in Fig. 3, and in the form here shown comprises a friction disc 10 disposed between a driving member 11 and a driven member 12. The driven member 12 is formed integrally with the pinion 6, and the hubs of these two parts are provided with self-lubricating bushings 13 which surround the motor shaft with some clearance. The driving member 11 is splined to the shaft 7, and is biased to the longitudinal position on the motor shaft in which the two members 11 and 12 are held in frictional engagement with the friction disc by means of a coil spring 14 which surrounds the motor shaft between the driving member and a washer 15. The washer 15 is also splined to the shaft 7, and is provided on its right-hand face, as viewed in Fig. 3, with rounded diametrically opposite projections 16 which cooperate with rounded diametrically opposite recesses 17 formed on the inner face of a nut 18 screwed onto the outer end of the motor shaft. It will be apparent that the force required to slip the coupling will depend upon the amount of compression of the spring 14, and that the compression of this spring can be readily varied by adjusting nut 18. It will also be apparent that the cooperation between the recesses 17 in the nut 18 and the projections 16 on the spring washer 15 makes the nut self-locking in positions half a turn apart, thereby enabling the desired adjustment to be readily obtained. It will be noted that the friction disc 10 is disposed in a cylindrical recess 19 formed in the driving member 11, which recess serves to maintain the friction disc in concentric relation with respect to the driving and driven members.

The governor comprises a stationary brake disc 20 provided on each side with a brake lining 21, and disposed between two rotatable brake discs 22 and 23. The stationary brake disc is loosely supported on brake anchor studs 24 and 25 which are secured respectively to the wall 5, and to a spaced wall 26 of the mechanism casing. The studs extend with clearance through diametrically opposite apertured lugs 20a and 20b formed on the stationary brake disc, and are each provided on opposite sides of the stationary brake disc with cotter pins 27 spaced apart a sufficient distance to permit a limited amount of axial movement of the stationary brake disc.

The rotatable brake disc 22 is formed integrally with the driving member 11 which latter is also formed integrally with a laterally projecting sleeve 28 disposed on the side of the driving member opposite to the friction disc 10. The sleeve 28 is maintained in axial alignment with the motor shaft 7 by means of the spring washer 15 and nut 18, and as best seen in Fig. 5 is provided in its opposite sides with helically arranged cam slots 28a and 28b the function of which will be made clear presently.

The other rotatable brake disc 23 is secured by means of bolts 31 and 32 (see Fig. 4) to diametrically opposite laterally projecting lugs 33 and 34 formed on a spider 35 (Fig. 7) mounted with some clearance on the sleeve 28. The bolts 31 and 32 serve as a means for adjusting for brake lining wear, and in order to allow the movable brake disc 23 to align itself when in engagement with the associated brake lining 21 the heads of the bolts cooperate with L-shaped lugs 23a and 23b formed on the brake disc and have their outer and inner faces rounded in the manner shown.

The spider 35 is provided in addition to the lugs 33 and 34 with two other pairs of lugs 36 and 37 (see Fig. 7) disposed between the lugs 33 and 34 at right angles thereto on opposite sides of the spider. These latter lugs support trunnion pins 38 and 39, which trunnion pins, in turn, pivotally support centrifuge weights 40 and 41. The centrifuge weights 40 and 41 are provided at their pivoted ends with inwardly projecting fingers 40a and 41a, respectively, which project with considerable clearance through openings 35a and 35b in the spider 35 and cooperate at their inner ends with the previously referred to cam slots 28a and 28b formed in the sleeve 28 in such manner that movement of the weights about the associated pivot pins will cause longitudinal movement of the spider, and will thus act to move the rotatable brake disc 23 axially toward or away from the rotatable brake disc 22. The centrifuge weights are constantly biased toward each other by means of coil springs 42 and 43 to the positions in which they engage stop surfaces 35c and 35d formed on the spider, and are provided with laterally projecting stop lugs 40c and 41c which cooperate with the lugs 36 and 37 to limit the outward movement of the centrifuge weights. The centrifuge springs are secured at their ends to eccentric studs 44 and 45 extending through openings 40d and 41d formed in the weights. The portion of the weights at the outer side of each opening is split and is provided with a clamping screw 46 to draw the split portions together whereby the studs may be readily rotated to different adjusted positions and clamped in place in their adjusted positions to enable the spring tension, and hence the braking effect which the governor will exert at any partcular speed to be readily varied.

The operation of the governor, as a whole, is as follows: When the gate is being raised, the motor shaft 7 rotates in a clockwise direction, as viewed in Fig. 2, and when it is being lowered, the motor shaft rotates in the opposite direction. Assuming that the gate arm is in its lowered position, and that the motor becomes energized to raise the gate arm, as soon as the motor becomes energized, the driving member 11 will start to rotate in a clockwise direction, as viewed in Fig. 2. When the driving member starts to rotate, the inertia of the centrifuge weights 40 and 41, the spider 35 and the brake disc 23, will tend to hold these parts stationary, and as a result, if the fingers 40a and 40b are initially in the leading ends of the cam slots 28a and 28b as will normally be the case under these conditions, the sleeve will rotate relative to the spider to the position in which the fingers 40a and 40b are disposed in the trailing ends of the slots. Due to the helical arrangement of the cam slots, this relative rotation of the sleeve and spider will cause the spider to move along the sleeve 28 in an axial direction toward the right as viewed in Fig. 3 to what we shall term its outer position and will thus move the brake disc 23 away from the brake disc 22. As soon as this initial relative movement of the parts has taken place, the fingers 40a and 41a will cooperate with the cam slots to cause the spider and associated parts to rotate with the driving member, and as the motor comes up to speed the resulting centrifugal force will tend to cause the weights to fly out in opposition to the opposing force of the biasing springs 42 and 43. Any outward movement of the weights 40 and 41 will act through the fingers 40a and 41a and cam slots 28a and 28b to move the spider 35 axially toward the left as viewed in Fig. 3 along the sleeve, and will thus tend to move the movable brake disc 23 toward the brake disc 22. The parts are so proportioned, however, that at the speed at which the motor will normally rotate while the gate arm is being moved to its raised position the outward movement of the weights will be insufficient to cause the movable brake discs to frictionally engage the brake linings 21 on the fixed brake disc with any appreciable force, and it follows, therefore, that under these conditions the governor will not exert any braking effort on the motor. If, however, the motor speed should increase above the normal clearing speed, for any reason, such as might happen for example if the gate arm had been broken off by being run into by a vehicle while it was in its lowered position, the increased speed due to the unbalanced torque exerted by the counterweights 8 would cause the weights to move out far enough to bring the movable brake discs into contact with the fixed brake disc, and thus apply sufficient braking effect to limit the motor speed to a speed which is insufficient to cause damage to the operating mechanism.

If because of friction or for any other reason, the inertia of the centrifuge weights, the spider and the brake disc 23 is not sufficient to move these parts to their outer positions relative to the sleeve 28 when the motor becomes energized under the conditions just described, the outward movement of the centrifuge members which occurs at the normal clearing speed will then be sufficient to move the fixed and rotatable brake disc into frictional engagement and braking of the motor will result. However, the frictional force which is developed by this braking will exert a torque on the centrifuge weight and spider assembly which will cause these parts to rotate relative to the sleeve in the same direction that they normally would initially rotate due to the inertia of the parts, and as a result the brake will automatically become released.

When the gate arm is in its raised position and the motor becomes energized to lower the gate arm, the centrifuge weight and spider assembly will normally occupy its outer position relative to the sleeve, and under these conditions, the inertia of the centrifuge weight and spider assembly will first cause this assembly to move axially along the sleeve to what we shall term its "inner" position as viewed in Fig. 3, after which the engagement of the fingers 40a and 41a on the centrifuge members 40 and 41 with the trailing ends of the cam slots 28a and 28b will cause these parts to rotate with the driving member 11. When the centrifuge weight and spider assembly occupies its inner position relative to the sleeve 28, the outward movement of the weights necessary to move the brake parts into frictional contact will obviously be considerably less than when this assembly occupies its outer position relative to the sleeve, and the parts are so proportioned that under these conditions the outward movement of the weights which takes place at the normal lowering speed will cause the brake to exert sufficient frictional force to prevent the motor from exceeding this speed. It should be particularly pointed out, however, that the brake parts will not under any conditions be moved into frictional engagement until after the motor has started to rotate, so that, the governor will not be effective under any condition to cause the gate to stall at zero or low speeds.

If due to friction or for other reasons, the centrifuge weight and spider assembly fails to initially move inwardly under the conditions last described, the motor speed will quickly exceed the normal lowering speed due to the torque provided by the non-balanced weight of the gate arm, and the centrifuge weights will therefore quickly move out far enough to cause the brake to function. As soon as the brake starts to function, the resulting torque exerted on the spider will cause the weight and spider assembly to automatically move to its inner position after which the brake will function in the normal manner to limit the lowering speed to the normal value.

It should be particularly pointed out that the engagement of the fingers 40a and 41a on the centrifuge weights 40 and 41 with the cam slots 28a and 28b in effect tie the two centrifuge weights together in such manner that they are constrained to move toward and away from the axis of rotation of the motor shaft together. In other words, the force of gravity will not cause them to oscillate as they revolve at low speeds. Furthermore, since the two centrifuge members are constrained to operate in unison, if the centrifuge springs should break, it is impossible for the brake to be applied by the gravity effect of one weight acting independently of the other.

Although we have herein shown and described only one form of governor embodying our invention, it is understood that various changes and modifications may be made therein within the scope of the appended claims without departing from the spirit and scope of our invention.

Having thus described our invention, what we claim is:

1. A governor comprising a driving member rotatable in two directions, a second member carrying centrifuge weights, means connecting said two members in such manner that said second member is constrained to rotate with said driving member but that the inertia of said second member and said centrifuge weights will cause a limited amount of relative axial movement of said two members in response to a change in the direction of rotation of said driving member, said means also being responsive to movement of said centrifuge weights due to centrifugal force for causing further axial movement of said second member relative to said driving member, and braking means operated by said further relative axial movement of said two members.

2. A governor comprising a driving member rotatable in two directions, a second member carrying centrifuge weights, means connecting said two members in such manner that said second member is constrained to rotate with said driving member but that the inertia of said second member and said centrifuge weights will cause a limited amount of relative axial movement of said two members in response to a change in the direction of rotation of said driving member, said means also being responsive to movement of said centrifuge weights due to centrifugal force for causing further axial movement of said second member relative to said driving member, and a friction disc brake operated by said further relative axial movement of said two members.

3. A governor comprising a driving member rotatable in two directions, a second member carrying centrifuge weights, means including fingers on said centrifuge weights extending into cam slots in said driving member for connecting said two members in such manner that said second member is constrained to rotate with said driving member but that the inertia of said second member and said centrifuge weights will cause a limited amount of relative axial movement of said two members in response to a change in the direction of rotation of said driving member, said connecting means also being effective in response to movement of said centrifugal weights by centrifuge force for causing further axial movement of said second member relative to said driving member, and a friction brake operated by said further relative axial movement of said two members.

4. A governor comprising a shaft rotatable in two directions, a driving member mounted on said shaft to rotate therewith and provided with a sleeve portion having helically arranged cam slots formed therein, a spider loosely mounted on said sleeve portion, centrifuge weights pivotally attached to said spider and provided with fingers extending into and cooperating with said cam slots, a fixed brake disc, and two movable brake discs secured respectively to said driving member and said spider and cooperating with opposite sides of said fixed brake disc.

5. A governor comprising a driving member rotatable in two directions and having a sleeve portion provided with oppositely disposed helically arranged cam slots therein, a spider supported on said sleeve portion, centrifuge weights pivotally mounted on said sleeve portion and provided with fingers extending into said cam slots, springs biasing said centrifuge weights toward said spider, a fixed brake disc, and two movable brake discs secured respectively to said driving member and said spider and cooperating with said fixed brake disc to form a brake, the parts being so proportioned that when the direction of rotation of said driving member is reversed the inertia of said spider, said centrifuge weights, and the movable brake disc secured to said spider will normally cause said fingers to move from the leading to the trailing ends of said cam slots to thereby move said spider to one or another axial position on said sleeve portion according as said driving member is rotated in one direction or the other and that said centrifuge weights will act through said fingers and said cam slots to cause said brake to become applied at one speed or another depending upon the axial position of said spider relative to said sleeve.

6. In combination, a shaft rotatable in opposite directions, a friction coupling including a driving member mounted on said shaft to rotate therewith, and a governor mounted on said shaft and comprising a sleeve portion formed integrally with said driving member, said sleeve portion being provided in opposite sides thereof with oppositely arranged similar helically disposed cam slots, a spider mounted on said sleeve portion, centrifuge weights pivotally mounted on said spider and having integral fingers extending into said cam slots to operatively connect said spider and said centrifuge weights with said driving member, and brake means operated by longitudinal movement of said spider relative to said sleeve caused by operation of said centrifuge weights by centrifugal force, said centrifuge weights being effective to apply said brake means at one speed or another according as said fingers are in one end or the other of said cam slots, the parts being so proportioned that said fingers will normally move to one end or the other of said cam slots according as said driven member is rotated in one direction or the other.

7. A governor comprising a driven member rotatable in opposite directions and provided with a sleeve portion having oppositely arranged helically disposed cam slots formed in opposite sides thereof, a spider mounted on said sleeve portion, centrifuge weights pivotally mounted on said spider and having integral fingers extending into said cam slots to operatively connect said spider and said centrifuge weights with said driving members, and brake means operated by longitudinal movement of said spider relative to said sleeve caused by operation of said centrifuge weights by centrifugal force, said centrifuge weights being effective to apply said brake means at one speed or another according as said fingers are in one end or the other of said cam slots, the parts being so proportioned that said fingers will normally move to one end or the other of said cam slots due to the inertia of the parts according as said driven member is rotated in one direction or the other but being moved from one end of said cam slots to the other due to the torque exerted on said sleeve when said brake becomes applied if they fail to move due to the inertia of the parts.

8. A governor comprising a driving member rotatable in two directions, a second member carrying centrifuge weights, means connecting said two members in such manner that said second member is constrained to rotate with said driving member but that the inertia of said second member and said centrifuge weights will normally cause a limited amount of relative axial movement of said two members in response to a change in the direction of rotation of said driving member, said means being responsive to movement of said centrifuge weights due to centrifugal force for causing other relative axial movement of said second member relative to said driving member, and braking means operated by said other relative axial movement of said two members, the parts being so proportioned that if said two members fail to move axially relative to each other due to the inertia of the parts in response to a change in the direction of rotation of said two members they will be moved axially due to the torque developed by said braking means in response to rotation of said driving member in excess of a predetermined speed.

GLEN V. JEFFERSON.
STANLEY E. GILLESPIE.